United States Patent
Hollingsworth

(10) Patent No.: US 10,406,777 B2
(45) Date of Patent: Sep. 10, 2019

(54) DRAPERY ADORNMENT AND SECURING MECHANISM

(71) Applicant: Linherr Hollingsworth, LLC, Norwalk, CT (US)

(72) Inventor: Linherr Hollingsworth, Darien, CT (US)

(73) Assignee: Linherr Hollingsworth, LLC, Norwalk, CT (US)

( * ) Notice: Subject to any disclaimer, the term of this patent is extended or adjusted under 35 U.S.C. 154(b) by 673 days.

(21) Appl. No.: 14/523,373

(22) Filed: Oct. 24, 2014

(65) Prior Publication Data
US 2016/0114560 A1  Apr. 28, 2016

(51) Int. Cl.
*B32B 7/06* (2019.01)
*B32B 5/02* (2006.01)
(Continued)

(52) U.S. Cl.
CPC ............. *B32B 7/06* (2013.01); *A47H 23/00* (2013.01); *B32B 3/04* (2013.01); *B32B 3/08* (2013.01);
(Continued)

(58) Field of Classification Search
CPC ............. A47H 23/00; A47H 2201/00; A47H 2201/01; A47H 2023/003–006;
(Continued)

(56) References Cited

U.S. PATENT DOCUMENTS 3,164,352 A * 1/1965 Weaver .............. A41G 1/00
160/330
3,483,494 A * 12/1969 Cromie .............. H01F 7/0215
128/852
(Continued)

FOREIGN PATENT DOCUMENTS

| CN | 203873493 U | * 10/2014 | |
| FR | 2807629 A1 | 10/2001 | ............. A41F 1/002 |
| WO | WO-2009061189 A1 | * 5/2009 | ............. A47H 13/14 |

OTHER PUBLICATIONS

"Sewing Magnets." K&J Magnets, Inc. K&J Magnets, Inc, Jan. 20, 2011. Web. Jun. 5, 2017. <https://www.kjmagnetics.com/blog.asp?p=sewing-magnets>.*
(Continued)

*Primary Examiner* — Marla D McConnell
*Assistant Examiner* — Larissa E Rowe
(74) *Attorney, Agent, or Firm* — Heslin Rothenberg Farley & Mesiti P.C.

(57) ABSTRACT

The present invention is a method for adhering a removable object to fabric and includes selecting a fabric, attaching an inter-lining fabric to the back side of the fabric, attaching a magnetic element to the inter-lining fabric, wherein an edge of the magnetic element is parallel to the leading edge of the fabric, attaching a lining fabric to the back side of the fabric, where the lining fabric is adjacent to the inter-lining, folding the leading edge of the fabric over the magnetic element, such that the fabric and the inter-lining overlap the magnetic element and attaching the leading edge to the lining fabric
(Continued)

adjacent to the inter-lining, and placing a metallic element on the front side of the fabric, such that the metallic element is positioned flush to the front side of the fabric and adheres to the fabric utilizing the force of the magnetic element.

1 Claim, 11 Drawing Sheets

(51) Int. Cl.
| | | |
|---|---|---|
| *D06Q 1/00* | (2006.01) | |
| *A47H 23/00* | (2006.01) | |
| *B32B 5/06* | (2006.01) | |
| *B32B 5/22* | (2006.01) | |
| *B32B 5/26* | (2006.01) | |
| *B32B 7/12* | (2006.01) | |
| *B32B 3/04* | (2006.01) | |
| *B32B 3/08* | (2006.01) | |
| *D06M 17/00* | (2006.01) | |

(52) U.S. Cl.
CPC ............... *B32B 5/02* (2013.01); *B32B 5/028* (2013.01); *B32B 5/06* (2013.01); *B32B 5/22* (2013.01); *B32B 5/26* (2013.01); *B32B 7/12* (2013.01); *D06Q 1/00* (2013.01); *A47H 2023/003* (2013.01); *B32B 2250/20* (2013.01); *B32B 2307/208* (2013.01); *B32B 2451/00* (2013.01); *B32B 2601/00* (2013.01); *D06M 17/00* (2013.01)

(58) Field of Classification Search
CPC ........ A47H 23/01–02; A47H 2023/025; A47H 23/04–14; D06Q 1/00; D03D 2700/0188; D06N 2211/122; B32B 5/06; B32B 7/04; B32B 7/045; B32B 2307/208; B32B 2451/00; B32B 3/02; B32B 3/06–085; B32B 3/10–16; B32B 7/00–14; D10B 2503/02; D04D 9/00; D05D 2303/02–06; C09J 7/00–50
USPC ............. 160/123–126, 330–350; 428/7, 101, 428/542.2–542.6, 900
See application file for complete search history.

(56) References Cited

U.S. PATENT DOCUMENTS

| | | | |
|---|---|---|---|
| 4,835,024 A * | 5/1989 | Hallay | A41G 1/00 |
| | | | 248/27.8 |
| 5,604,960 A | 2/1997 | Good | |
| 6,035,449 A | 3/2000 | Galler et al. | |
| 6,052,828 A | 4/2000 | Widdemer | |
| 6,163,889 A | 12/2000 | Tate | |
| 6,282,760 B1 | 9/2001 | Mars | |
| 6,301,754 B1 * | 10/2001 | Grunberger | A41F 1/002 |
| | | | 24/303 |
| 6,412,116 B1 | 7/2002 | Clark | |
| 7,187,261 B2 | 3/2007 | Cassar | |
| 8,387,412 B2 | 3/2013 | O'Byrne | |
| 8,408,730 B2 | 4/2013 | Hurwitz | |
| 2007/0083971 A1 * | 4/2007 | Scully | A41D 15/002 |
| | | | 2/69 |
| 2007/0186390 A1 | 8/2007 | Johnston | |
| 2010/0181032 A1 * | 7/2010 | Bennett | A47H 2/00 |
| | | | 160/330 |
| 2010/0269239 A1 * | 10/2010 | Kulp | A41D 27/08 |
| | | | 2/69 |
| 2010/0275419 A1 | 11/2010 | Millus | |
| 2011/0219587 A1 * | 9/2011 | Nizan | A41D 27/08 |
| | | | 24/303 |
| 2013/0042984 A1 * | 2/2013 | Croucher | A47H 13/16 |
| | | | 160/330 |
| 2014/0166215 A1 * | 6/2014 | Thomas | A47H 2/00 |
| | | | 160/38 |

OTHER PUBLICATIONS

"CN203873493_Machine Translation" is a machine translation of CN 203873493U.*
"FR2807629_Machine Translation" Is a machine translation of FR 2807629. (Year: 2001).*
Ursula. "How to Make Custom DIY Magnetic Tins." Tatertots and Jello. N.p., Aug. 1, 2014. Web. <https://tatertotsandjello.com/how-to-make-custom-diy-magnetic-tins/>. (Year: 2014).*

* cited by examiner

DRAPERY ADORNMENT AND SECURING MECHANISM

FIELD OF INVENTION

The present invention relates to an adornment for drapery and a mechanism for securing the adornment.

BACKGROUND OF INVENTION

For years it has been common practice to adorn draperies and upholstery with woven fabric trimmings. However, these trimmings add a permanent element to draperies and upholstery they adorn and are not easily removable or replaceable. Engineering a seamless way to affix decorative trim pieces to soft drapery fabrics or decorative furnishings in a manner in which the decorative elements are changeable, i.e., non-permanent, and preserve the appearance of the soft drapery fabrics or decorative furnishings has presented a challenge.

SUMMARY OF INVENTION

Shortcomings of the prior art are overcome and additional advantages are provided through the provision of a method for adhering a removable object to fabric, the method includes: selecting a fabric, the fabric includes a front side, a back side, a top edge, a bottom edge, where the top edge is parallel to the bottom edge; and a leading edge, where the leading edge is perpendicular to the top edge; attaching an inter-lining fabric to the back side of the fabric, where the inter-lining is attached to the fabric by attaching the bottom edge of the fabric to the inter-lining; attaching a magnetic element to the inter-lining fabric, where an edge of the magnetic element is parallel to the leading edge of the fabric; attaching a lining fabric to the back side of the fabric, where the lining fabric is adjacent to the inter-lining; folding the leading edge of the fabric over the magnetic element, such that the fabric and the inter-lining overlap the magnetic element and attaching the leading edge to the lining fabric adjacent to the inter-lining; and placing a metallic element on the front side of the fabric, such that the metallic element is positioned flush to the front side of the fabric and adheres to the fabric utilizing the force of the magnetic element.

Shortcomings of the prior art are overcome and additional advantages are provided through the provision of a fabric adornment includes: a fabric comprising a concealing portion adapted to conceal a magnetic element; the magnetic element concealed within the concealing portion, where the magnetic element is adapted to attract a metallic element; and the metallic element adapted to rest substantially flush against the fabric, where the metallic element is joined to the fabric by the magnetic force of the magnetic element, and where the drape and shape of the fabric are substantially the same both with and without the metallic element.

Shortcomings of the prior art are overcome and additional advantages are provided through the provision of a fabric adornment includes: a fabric comprising a concealing portion adapted to conceal a magnetic element, where the concealing portion comprises an inter-lining fabric connected to the fabric and forming a layer between the fabric and the magnetic element; the magnetic element concealed within the concealing portion, where the magnetic element is adapted to attract a metallic element, where the magnetic element comprises at least one magnet contained in a mesh tape, and where the mesh tape adheres to the at least one magnet, such that the position of the at least one magnet is secured by the mesh tape and the mesh tape surrounds the magnet on all sides; and a metallic element adapted to rest substantially flush against the fabric, where the metallic element is joined to the fabric by the magnetic force of the magnetic element, and wherein the drape and shape of the fabric are substantially the same both with and without the metallic element.

Additional features are realized through the techniques of the present invention. Other embodiments and aspects of the invention are described in detail herein and are considered a part of the claimed invention.

BRIEF DESCRIPTION OF DRAWINGS

The foregoing and objects, features, and advantages of one or more aspects of the invention are apparent from the following detailed description taken in conjunction with the accompanying drawings in which.

DETAILED DESCRIPTION OF THE INVENTION

Utilizing a customized magnetic system and proprietary metalwork, draperies and upholstery can be trimmed with decorative custom designed metalwork. Advantages of embodiments of the present invention include providing a method and apparatus for affixing metalwork to drapery in a non-permanent manner while preserving the appearance and the integrity of the drapery.

In an aspect of the present invention, the visual appearance of the exterior (face or back of the fabric) where the metal trimmings are attached to the material remains unencumbered. For example, the drape/shape of the furnishing/drapery to which metalwork is applied in an embodiment of the present method remains soft and natural, with no indication of an element being present inside a furnishing/drapery. Maintaining the visual appearance, including the drape/shape of any fabric to which an embodiment of the present apparatus is applied is an advantage of embodiments of the present invention because of the aesthetic appeal of the result.

Figure 1:
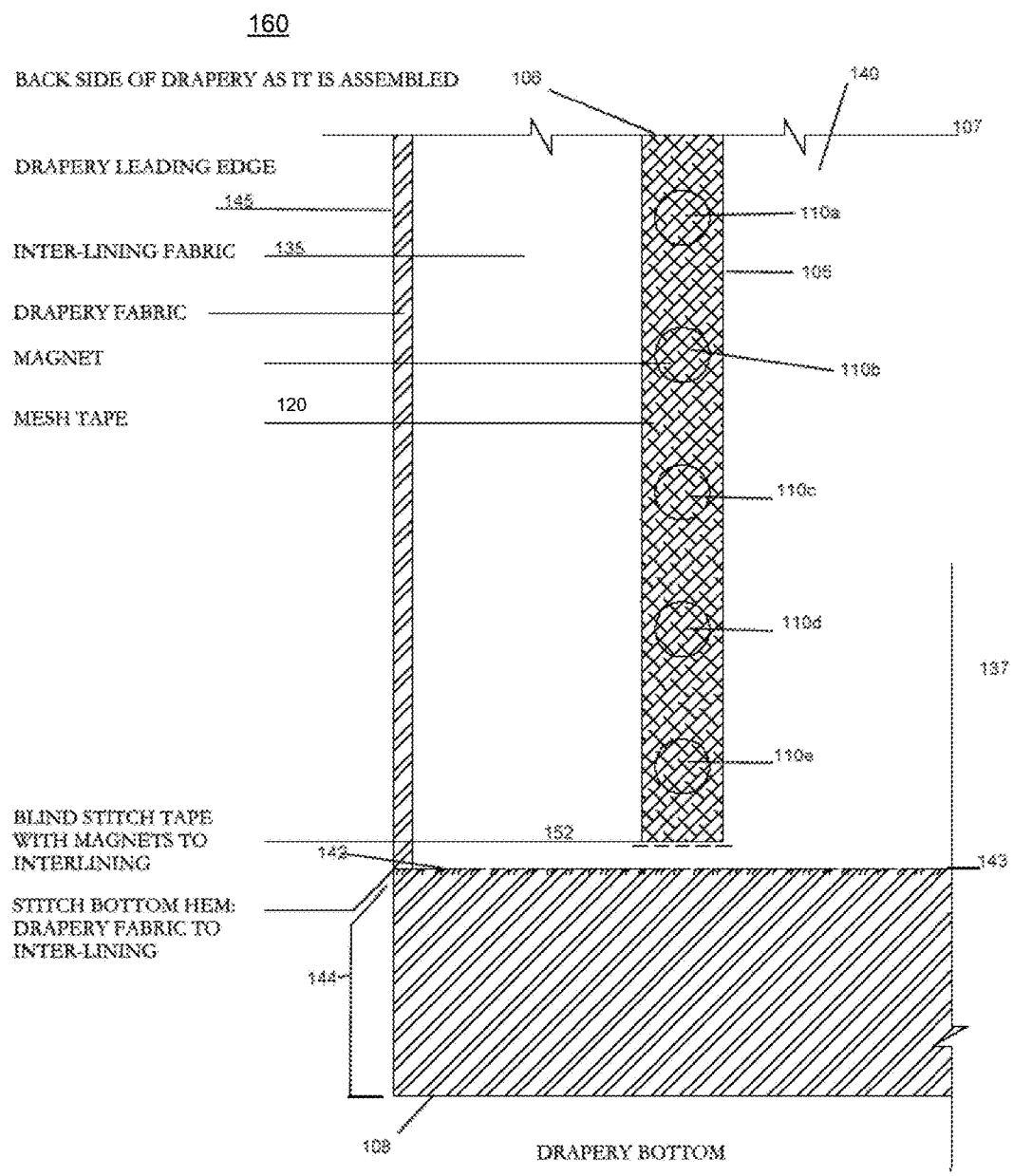
FIG. 1 depicts an aspect of an embodiment of the present invention.
Figure 2:
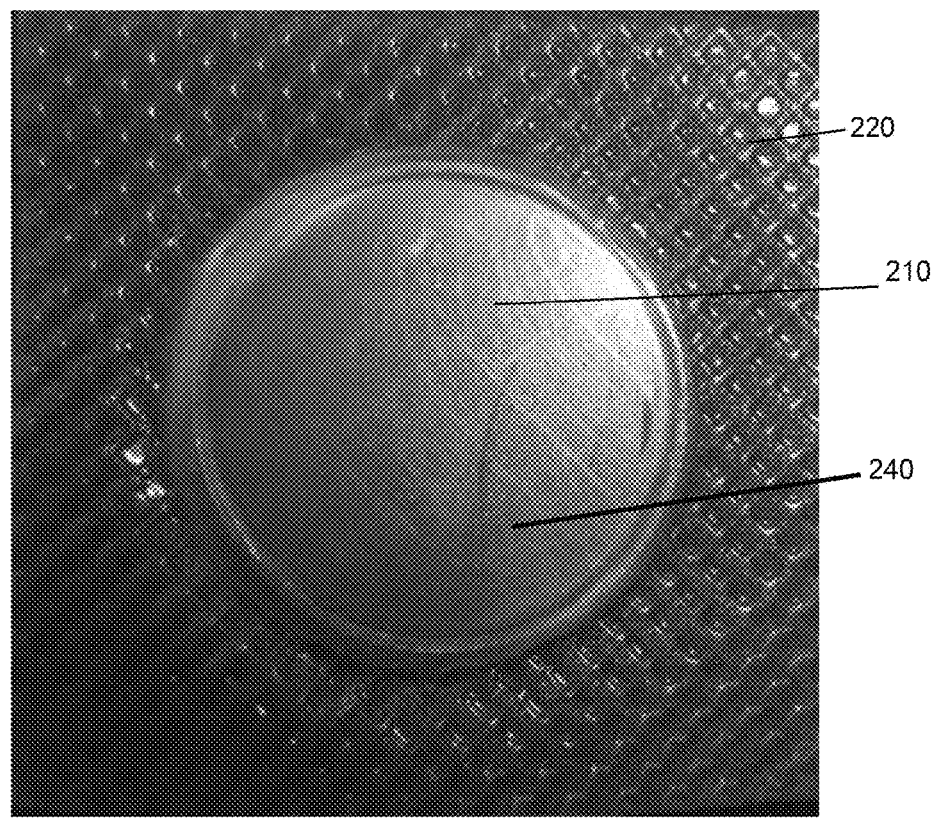
FIG. 2 depicts an aspect of an embodiment of the present invention.

In a further aspect of the invention, the method of attaching a metal embellishment to a furnishing/drapery maintains the visual appearance of the exterior of the furnishing/drapery, even when the metal embellishment is removed. FIG. 1 depicts an embodiment of the present invention and also demonstrates how the invention can be made, while FIG. 2 shows an aspect of an embodiment, a sample magnetic element. Meanwhile, FIG. 3 is an example of an embodiment of the invention which highlights the aesthetics of the invention, specifically, how embodiments of the present invention maintain the visual appearance of any decorative fabric element, such as drapery, including the drape/shape of any fabric to which an embodiment of the present apparatus is applied.

In an embodiment of the present invention, the metal embellishment is comprised of at least one flat metal object. In a further embodiment of the present invention, the metal embellishment is comprised of at least one three dimensional casted metal object. In a further embodiment the present invention, an embellishment is utilized that is not metal, but contains a magnetic element. In a further embodiment of the present invention, an embellishment contains a hollow area that is placed in close proximity to the face of a drapery. One or more magnets are affixed in the hollow area, so that at least some of the magnets are in contact with the face of the drapery and are held in a position at the front of the drapery by a magnetic force between the embellishment and the magnetic elements in the drapery.

Figure 3:
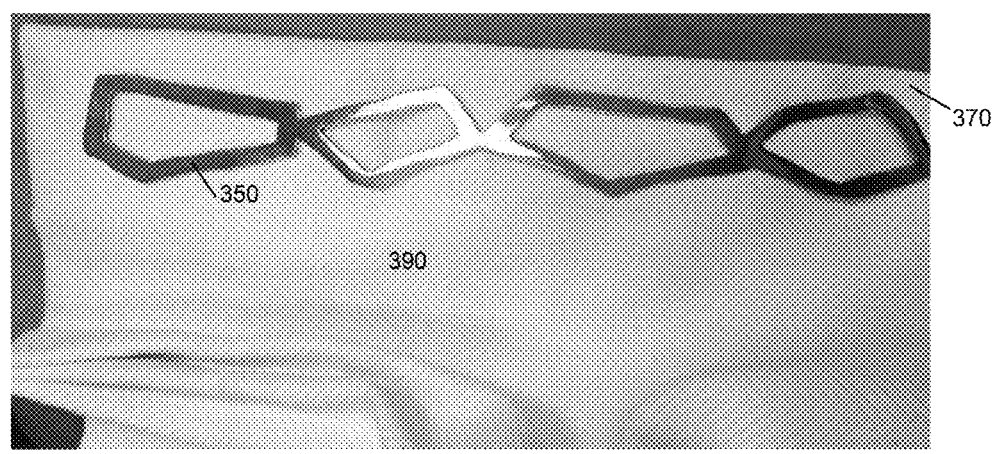
FIG. 3 depicts an aspect of an embodiment of the present invention.

Because FIG. 3 shows an embodiment of the invention having been applied to a drape, which is a non-limiting example of a fabric-based item to which the elements can be applied, the elements that comprise this embodiment are not readily visible. In FIG. 3, a metallic element 350 is attached to a front surface 390 of a fabric 370, in this case, a hanging curtain, using the magnetic force of a magnet (not pictured) concealed in a compartment of the drapery.

FIG. 3 is included to show the appearance of an embodiment of the present invention, FIGS. 1, and 4-6 demonstrate both some components that comprise as embodiment of the invention and demonstrate parts of a method for assembling an embodiment of the present invention. Meanwhile, while FIG. 2 shows aspects of one or more individual detail components of an embodiment of the present invention. These FIGs demonstrate aspects of embodiments that, in accordance with FIG. 3, enable the metallic elements 350 to adhere to the fabric 370, while maintaining the visual appearance of the fabric 370.

Figure 4:
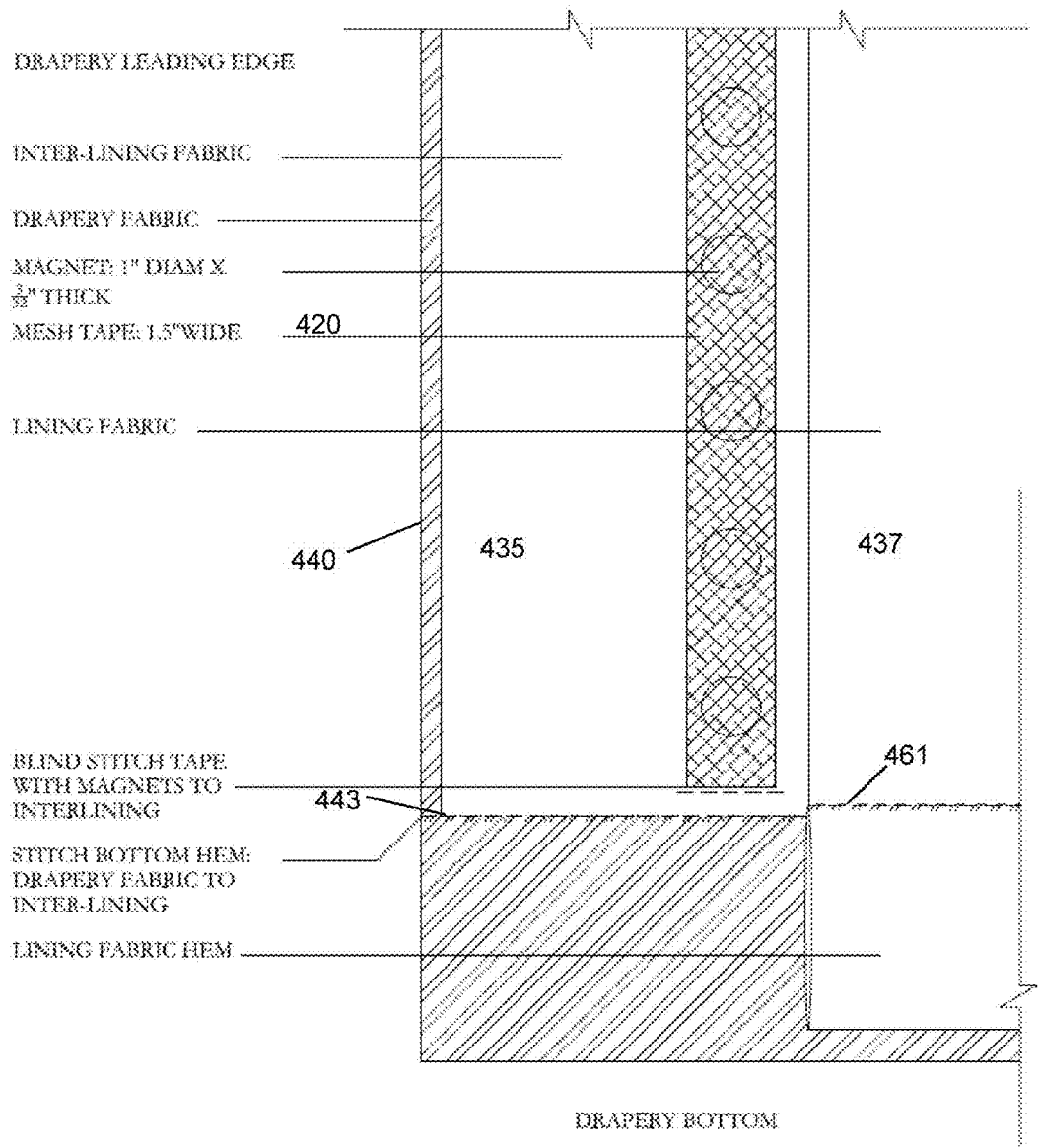
FIG. 4 depicts an aspect of an embodiment of the present invention.
Figure 5:
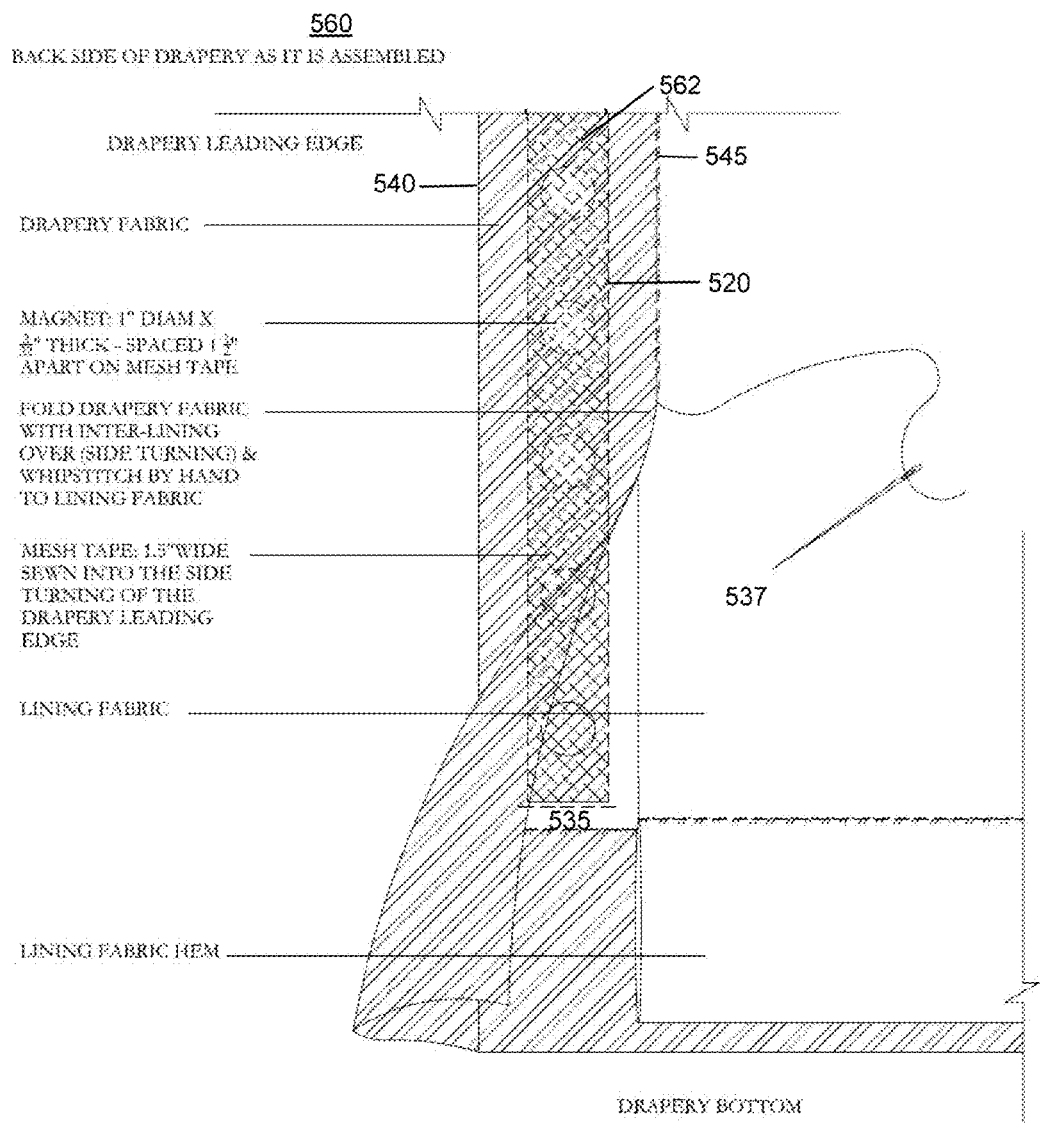
FIG. 5 depicts an aspect of an embodiment of the present invention.

FIG. 1 depicts details of an embodiment of the present invention which are observed as FIG. 3. FIG. 1 shows components of an embodiment of the present invention before the embodiment is fully assembled. FIG. 1 pictured from the perspective of a back side 160 of fabric 140 (e.g., a drapery). Once assembled, as shown in later figures, the metallic element 350 of FIG. 3 would be attached to the opposing side of the fabric, not the back side 160, which is the perspective from which FIG. 1, as well as FIGS. 4-5, are presented.

In this embodiment, a magnetic element 105 is comprised of at least one magnet 110a-110e and is enclosed in a sleeve and/or pocket of mesh 120. The magnetic element 105 is positioned along a longitudinal axis 106 that runs perpendicular to both the top 107 of the fabric 140 and the bottom 108 of the fabric 140. The longitudinal axis 106 upon which the magnetic element 105 is positioned is also parallel a leading edge 145 of the fabric 140. The positioning of the present invention utilizing the leading edge is just one example of the positioning when the fabric is utilized for a specific purpose, in this case, a drapery. One of skill in the art will recognize that the placement of the elements described in FIG. 1 will vary in accordance with the intended use of the fabric to which the metallic elements are being affixed. For example, placement may vary when the described invention is utilized in table skirts, pillows, etc.

The magnetic element 105 pictured in FIG. 1 can attract the metallic element 350 in FIG. 3. The mesh 120 that surrounds the at least one magnet 110a-110e can be permeated by a magnetic force associated with the at least one magnet 110a-110e. The mesh 120 is positioned adjacent to an inter-lining fabric 135, which is affixed to the back side of the fabric 140. As discussed later in reference to FIG. 4, lining fabric 137 may also be layered into the assembled embodiment of the invention. In an embodiment of the present invention, the inter-lining fabric 135 is comprised of a cotton bump material of a thickness that does not inhibit the magnetic force of the magnetic element upon a metallic element. In an embodiment of the present invention, the inter-lining is comprised of a thin to medium bump.

In the embodiment of FIG. 1, the mesh 120 and the inter-lining fabric 135, are positioned at a distance from a leading edge 145 of the fabric 140, such that the fabric 140 extends beyond the inter-lining 135. The fabric 140 is connected to the inter-lining 135 by using stitching 142 or other similar methods of affixing fabric together, such as glue and/or staples, known to one of skill in the art. The stitching 142 is applied at a bottom hem 143 of the fabric 140. This bottom hem 143 is parallel to the bottom 108 of the fabric 140. The bottom hem 143 creates a bottom portion 144 of the fabric 140 where the fabric 140 is folded over and therefore, layered.

In a further embodiment of the present invention, the mesh 120 and the inter-lining fabric 135, are positioned at the leading edge 145 of the fabric 140.

Returning to FIG. 1, as aforementioned, the at least one magnet 110a-110e enclosed in mesh 120 is adjacent to the inter-lining 135. In the embodiment of FIG. 1, the mesh 120 is affixed to the inter-lining 135 utilizing blind stitch tape 152. Blind stitch tape 152 is utilized in this example in order to keep the interior of the fabric 140 smooth in order to maintain the shape and drape. In an embodiment of the present invention, the blind stitch tape 152 is positioned parallel to the bottom hem 143 at a given longitudinal distance from the bottom hem 143. One of skill in the art will recognize that other materials can be substituted for the blind stitch tape 152.

In a further embodiment of the present invention, the mesh 120 is connected to the fabric 140 and/or interlining 135 and the inter-lining 135 is connected to the fabric 140 and/or a lining positioned between the fabric 140 and the interlining 135. In this embodiment, the drapery bottom 108 is left open. When assembled, the leading edge 145 is secured to the fabric 140 so that the inter-lining 135 and the mesh 120 are both enclosed when the leading edge 145 is folded over and secured. The drapery bottom 108 is not responsible for enclosing the mesh tape 120 and the magnetic elements 110a-110e in the drapery. The attachment of the leading edge 145 to a portion of the drapery assists in positioning the mesh tape 120 and the magnetic elements 110a-110e.

The magnetic element of 105 in FIG. 1 is only one example of a magnetic element 105 that can be used in the present invention. As seen in FIG. 1, in an embodiment of the present invention, mesh 120 (mesh tape) is utilized to create a sleeve to hold the at least one magnet 110a-110e. In another embodiment of the present invention, a magnetic element is a continuous magnet of a given length, rather than a group of magnets enclosed in mesh tape. In a further embodiment of the present invention, the magnetic element is a magnetic powder that contained in a specified shape by a containment element that contains the powder on all sides, such as a mesh tape, formed into a sleeve. Consistent across the different magnetic elements that can be adapted for use in the present invention is that they are thin along the z-axis of FIG. 1. Magnets that are thin along this axis present the advantage of being more easily concealed in a fabric element.

FIG. 2 is an example of a magnet 210 that and a mesh 220 portion that can be utilized in an embodiment of the present invention. In this embodiment, the mesh tape is situated so as to create pockets that encircle the magnets. The portions of the tape that contact the upper and lower surfaces of the magnet are smooth, so as it allow the magnetic force of the magnets to remain consistent over at least one of the lower surface (not shown in FIG. 2) and/or the upper surface 240 of the magnet and to provide a level surface upon which to attach metallic elements. The portion of the mesh tape in which the magnet 210 is not enclosed is of a rougher texture. Although the magnet in FIG. 2 is a circular disk of a given diameter, further embodiments of the present invention utilize magnets of varying shapes and sizes that can be selected depending upon the fabric in which they are concealed and the metal portion that is adhered to the outside of the fabric by utilizing the magnetic force of the magnets as received by the metal portion through the fabric.

In an embodiment of the present invention, the mesh 220 that encapsulates the magnet 210 is wider than the maximum width of any portion of the magnet 210. As seen in FIG. 1, the diameter of the mesh 120 exceeds the diameter of the magnets 110a-110e. Utilizing a mesh 120 with a greater diameter than the magnetic elements of the invention allows the magnets to be more easily positioned and concealed within fabric.

Referring to FIG. 1, when making the invention, various characteristics of the magnets are changeable, depending upon the appearance desired for the assembled embodiment of the invention. Variations in the magnets may include, but are not limited to, the size of the magnets, the shape of the magnets, the number of magnets, and the spacing between the magnets. However, in embodiments of the present invention, the materials and sizing selected provide the advantages of being able to conceal the magnetic elements and maintain the look of the fabric 140, including, but not limited to the drape/shape of the fabric.

FIG. 4, as discussed earlier, depicts an embodiment of the present invention that includes a lining fabric 437, which overlaps the inter-lining 435 upon which the mesh 420 is positioned. In this embodiment, the lining fabric 437 is stitched with a hem 461 so that the lining fabric 437 is doubled where the fabric 440 is doubled because of the aforementioned bottom hem 443 of the fabric 440, which attaches the fabric 440 to the inter-lining 435. In an embodiment of the present invention, the drapery bottom is left open and plays no role is securing elements of the present invention to the drapery.

FIG. 5 further depicts the assembly of an embodiment of the present invention. In this embodiment, fabric 540 from the drapery's leading edge 545 is overlapped with the mesh 520 and secured to the lining fabric 537. In FIG. 5, the securing is shown as being accomplished by stitching by hand, however, the securing can be accomplished in a variety of other ways known to one of skill in the art, including but not limited to, machine stitching, stapling, taping, etc. By overlapping the leading edge 545 of the fabric 540, the inter-lining fabric 535, is positioned on the mesh 520, therefore, the mesh 520 is in contact with the inter-lining fabric 535 on two parallel sides of the mesh 520. In the embodiment of FIG. 5, both a first side 562 of the mesh 520, a second side (not pictured) are in contact with inter-lining fabric 535 and both the first side 562 and the second side (not pictured) are parallel to the back side 560 of the fabric 540.

In an embodiment of the present invention, the drapery bottom is left open. Returning to FIG. 5, as aforementioned, the leading edge 545 of the fabric 540, the inter-lining fabric 535, is positioned on the mesh 520, therefore, the mesh 520 is in contact with the inter-lining fabric 535 on two parallel sides of the mesh 520. The drapery bottom is then left open and the hemming that is seen in FIG. 5 is not present in every embodiment of the invention and does not secure the elements described.

Figure 6:
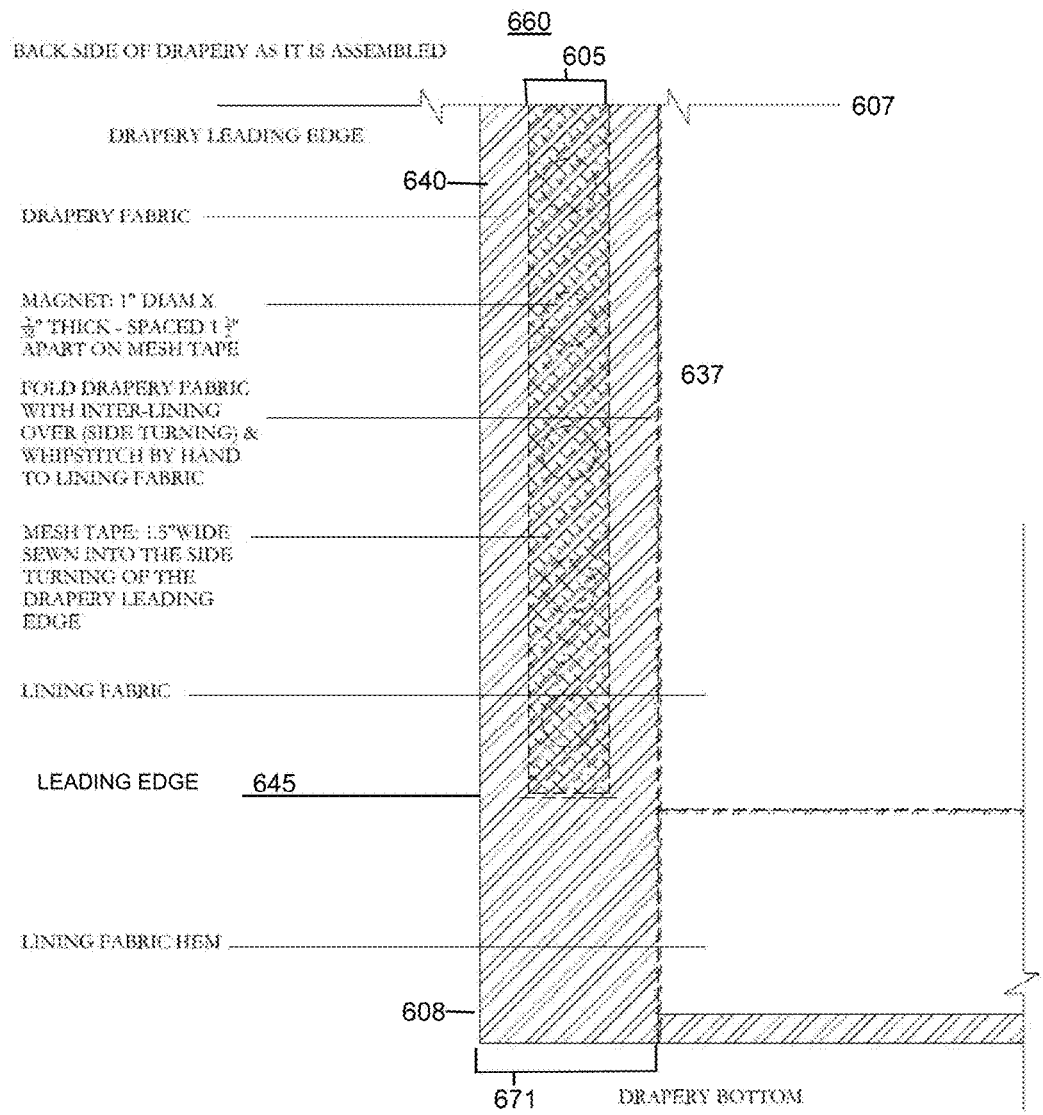
FIG. 6 depicts an aspect of an embodiment of the present invention.

FIG. 6 depicts an embodiment of the present invention from the perspective of the back side 660 of the fabric 640 after the magnetic element 605 has been fully enclosed in the fabric 640. As discussed in reference to FIG. 5, the fabric 640, to which the inter-lining (not shown in FIG. 6) was attached, was folded over the magnetic element 605 and affixed to the lining fabric 637. The attachment of the folded over portion 671 to the lining fabric 637 positions the magnetic element 605 parallel to the leading edge 645 of the fabric 640 and perpendicular to the top 607 of the fabric 640 and the bottom 608 of the fabric 640. This orientation is used in this embodiment in order to accommodate a given coupling with a metallic element. The orientation can be varied in additional embodiments of the present invention to create different aesthetics.

Figure 7:
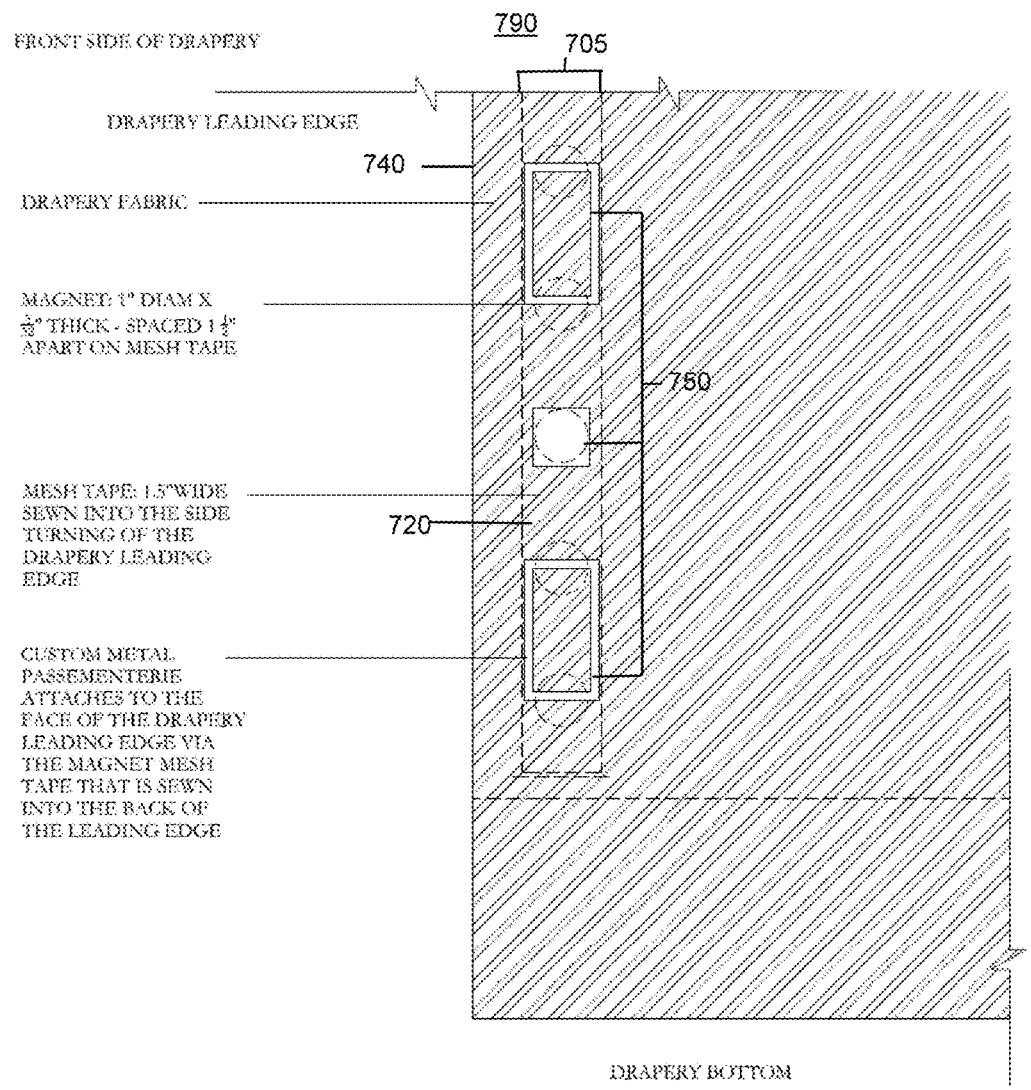
FIG. 7 depicts an aspect of an embodiment of the present invention.

FIG. 7 depicts the assembled embodiment of FIG. 6 from the perspective of the front surface 790 of the fabric 740 (e.g., drapery). The metallic element 750 is coupled to the magnetic element 705 utilizing the magnetic force of the magnetic element 705 that permeates the fabric 740, the inter-lining fabric (not pictured), and the mesh 720. In FIG. 7, the metallic element 750, also called an adornment, is comprised on more than one piece. This is an example of a metallic element 750 as metallic elements of different embodiment vary in configuration. The metallic element 750 is adapted to rest substantially flush against the front surface 790 of the fabric 740. Additionally, the positioning of the metallic element 750 on the front surface 790 of the fabric 740 does not affect the shape and/or drape of the fabric 740.

As aforementioned FIGS. 1-2 and 4-7 demonstrate the assembly of an embodied of the present invention by showing an embodiment of the present invention in different stages in an assembly process. As seen in these figures, an embodiment of the present invention includes a metallic element, a magnetic element, and an enclosure in a fabric that conceals the magnetic element, so that the metallic element can be attached to the fabric by utilizing the magnetic force of the magnetic elements that permeates the fabric enclosure. In an embodiment of the present invention, the enclosure for the magnetic element includes a compartment in a fabric lined with inter-lining fabric and attached the lining fabric.

Figure 8:
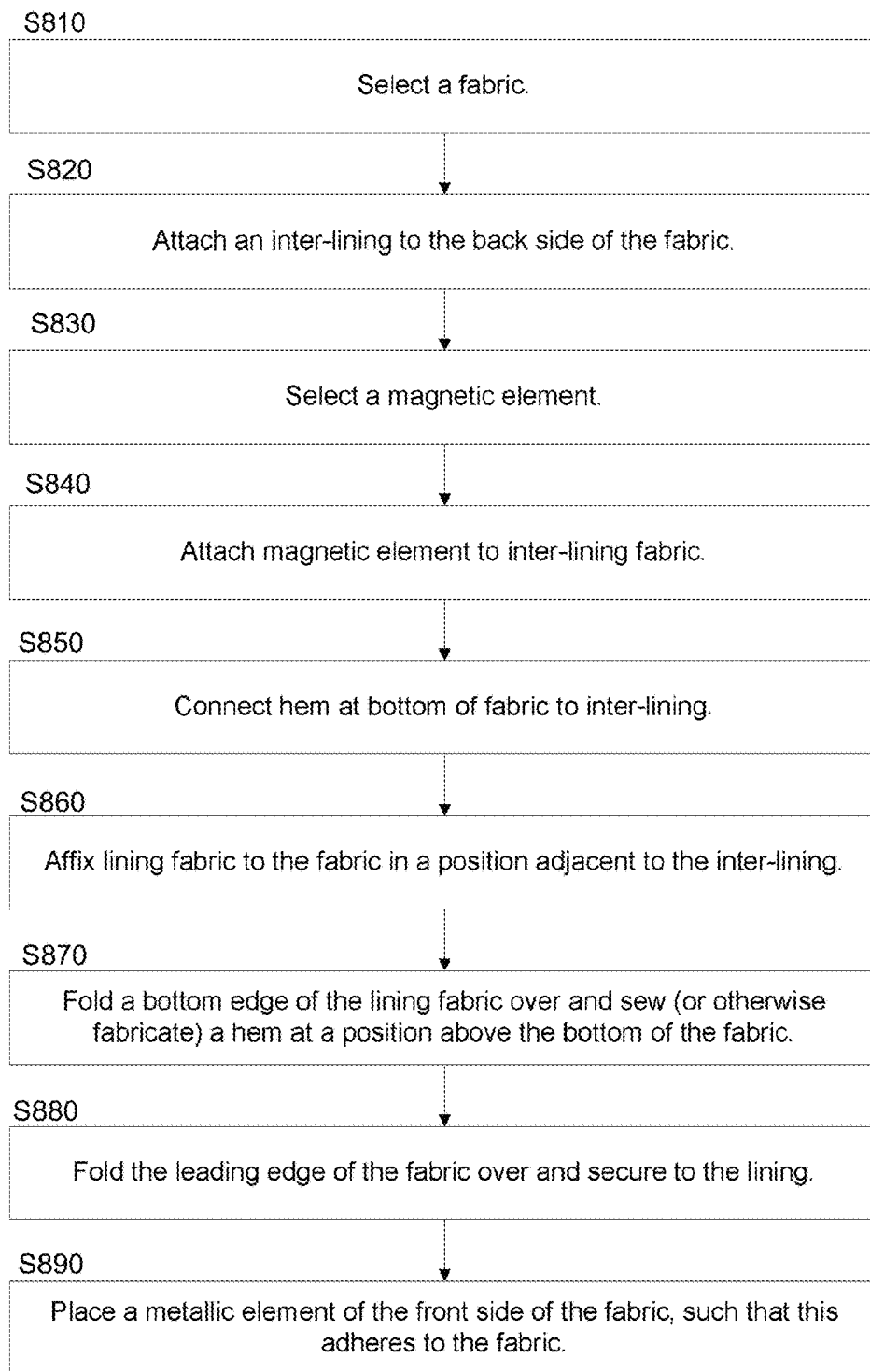
FIG. 8 depicts a workflow associated with assembling an embodiment of the present invention.

FIG. 8 is a flow chart depicting an embodiment of a method of making the present invention. The method includes selecting a fabric (S810). The fabric selected is the fabric upon which a metallic element will eventually rest. Thus, the selection of the fabric may be governed by its aesthetic appeal. The fabric selected has a front side and a back side, the front side being the more attractive of the sides and the one that will be visible on the assembled embodiment. The fabric also has a top and a bottom. A leading edge of the fabric connects the top and the bottom of the fabric on a longitudinal axis.

After selecting a fabric, the method includes attaching an inter-lining fabric to the back side of the fabric (S820), such that the inter-lining is placed on top of the back of the fabric and lies flush on the back side of the fabric. In an embodiment of the present invention, an edge of the inter-lining of the fabric should be parallel to the leading edge of the fabric and be placed at a specified distance from the leading edge of the fabric.

In the embodiment of FIG. 8, the method further includes selecting a magnetic element (S830). A magnetic element utilized in an embodiment of the present invention includes at least one magnet enveloped in a mesh tape that adheres to the magnets, such that the position of the at least one magnet is secured by the mesh tape and the mesh tape surrounds the magnet on all sides.

Upon selecting a magnetic element, in an embodiment of the present invention, the method includes attaching the magnetic element to the inter-lining fabric (S840). In an embodiment of the present invention, the magnetic element is placed such that an edge of the mesh is parallel to the leading edge of the fabric. In an embodiment of the present invention, the magnetic element is attached to the fabric with blind stitch. In an embodiment of the present invention, mesh tape is tacked along the vertical axis to the inner lining. In an embodiment of the present invention, the blind stitch tape is positioned at the end of the magnetic element that is closest the bottom of the fabric. In an embodiment of the present invention, an edge of the magnetic element is placed on the same latitudinal axis as the top of the drapery.

In an embodiment of the present invention, a hem at the bottom of the fabric is connected to the inter-lining (S850). In an embodiment of the present invention, the connection between the inter-lining and the fabric is a mesh tape, stitching and/or glue.

In an embodiment of the present invention, a lining fabric is affixed to the fabric in a position adjacent to the inter-lining (S860), so that the lining fabric borders an edge of the inter-lining that is furthest from the leading edge of the fabric. In an embodiment of the present invention, a bottom edge of the lining fabric is folded over and a hem is sewn (or otherwise fabricated) at a position above the bottom of the fabric (S870).

In an embodiment of the present method, the leading edge of the fabric is folded over and secured to the lining (S880). In an embodiment of the present invention, the securing includes stitching the fabric to the lining. The stitching can be accomplished by hand utilizing a whipstitch. The fabric is secured to the lining such that the inter-lining is in contact with the magnetic element on both sides of the magnetic element parallel to the front and the back of the fabric. Connecting the fabric to the lining in a manner where the fabric overlaps the magnetic element can be accomplished in a variety of different ways, including using glue and/or staples together with and/or instead of stitching.

An embodiment of the present method further includes placing a metallic element of the front side of the fabric, such that this element lies flat on the front of the fabric and adheres to the fabric utilizing the force of the magnetic element, which permeates the inter-lining and the fabric (S890). The magnetic element is attached in a manner where it lies flush on the front of the fabric. In another embodiment of the present invention, the magnetic element is a three dimensional shape that does not lie flat above that magnetic elements but adheres to the fabric based on the parts of the magnetic element that come into contact with the fabric.

Figure 9:
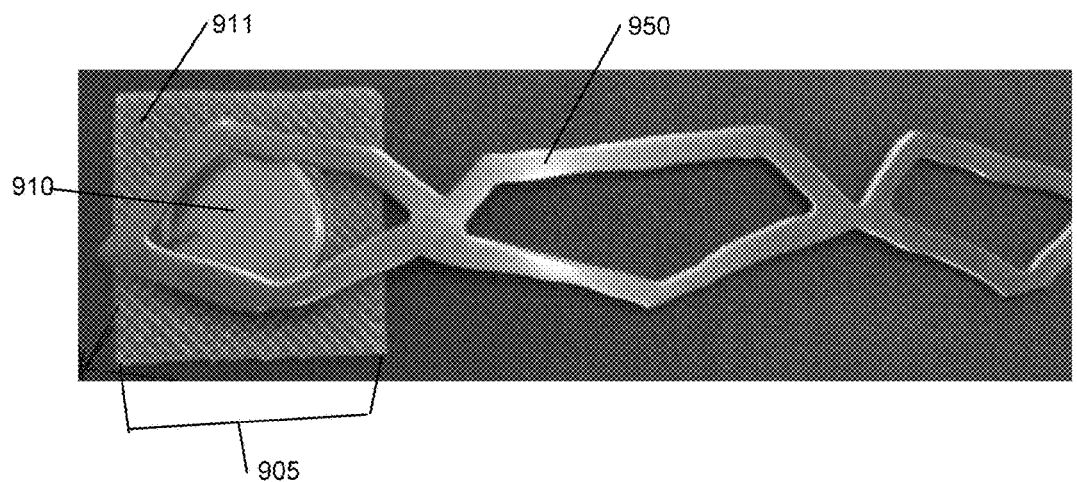
FIG. 9 demonstrates aspects of an embodiment of the present invention.
Figures 10A, 10B, 10C, 10D, 10E, 10F, 10G, 10H, 10I, 10J, 10K, 10L:
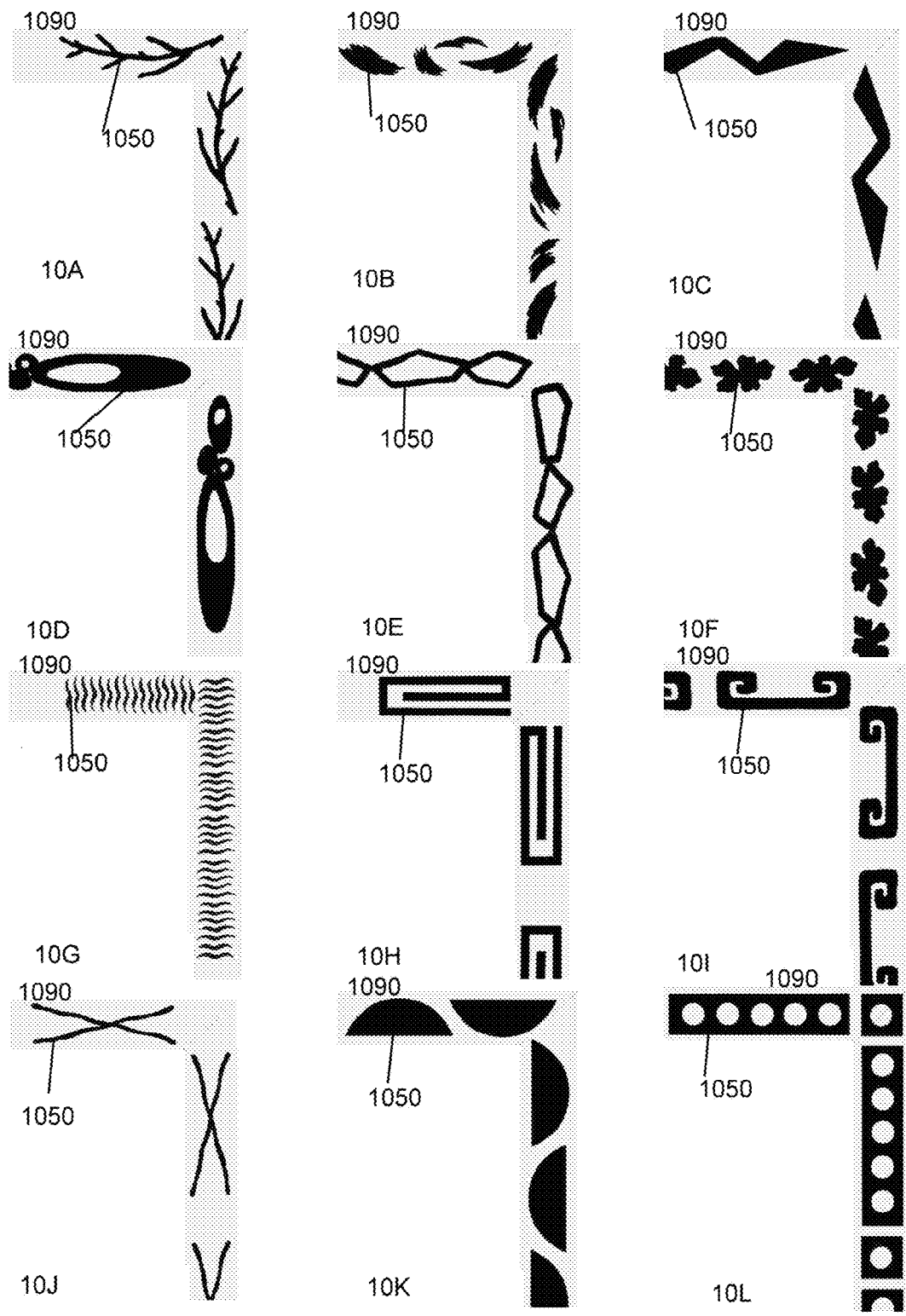
FIGS. 10A-10L depict various configurations of the metallic element of various embodiment of the present invention.

FIG. 9 demonstrates aspects of an embodiment of the present invention by showing a metallic element 950 coupled directly to a magnetic element 905, comprised of a magnet 910 enclosed in mesh tape 911. In embodiments of the present invention, fabric and/or an inter-lining fabric are situated between the metallic element 950 and the magnetic element 905. However, FIG. 9 shows how the elements connect.

The metallic elements utilized in embodiments of the present invention vary widely in shape, and depending upon the fabric. In some embodiments of the present invention, the elements can lie predominantly flat on the side that lies flush on the fabric and is connected to the fabric with the magnetic element. FIGS. 10A-10L are examples of different elements that can be utilized in embodiments of the present invention. In each of these examples, a front surface 1090 of a fabric is shown with one or more metallic element 1050 affixed using aspects of the described method. These figures are merely examples of many different magnetic elements that can be utilized with aspects of the present invention. Although FIGS. 10A-10L are pictured with metallic elements 1050 as flat metal items, the metallic elements may also include three dimensional casted metal pieces.

Figure 11:
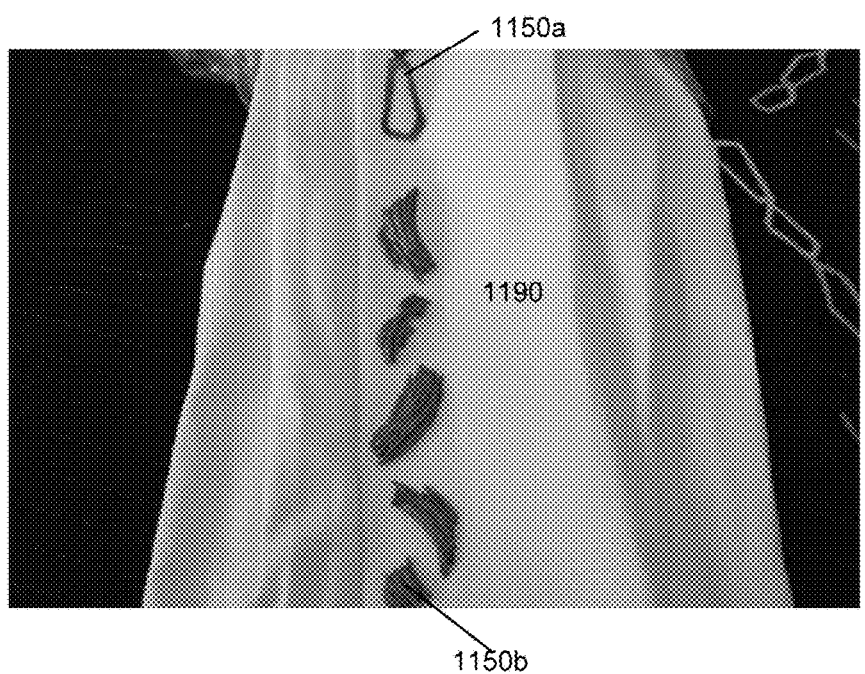
FIG. 11 depicts aspects of at least one embodiment of the present invention.

FIG. 11 illustrates two different types of embellishments that can be utilized in embodiments of the present invention. A first embellishment is a metal element 1150*a* that is flat and affixed flush to a drapery 1190. The second embellishment is a three dimensional element 1150*b* that is affixed to the drapery 1190 by a magnetic force. The three dimensional element 1150*b* may be metal or non-metal. Non-metal elements may contain hollowed portions that contain at least one magnet. Thus, the magnet is the three dimensional element 1150*b* can be affixed to the drapery 1190 based on the magnetic force of the magnetic elements (not shown) inside the drapery. When three dimensional element 1150*b* is metal, magnets may be added and/or portions of the three dimensional element 1150*b* in closest proximity to the magnetic elements (not shown) will adhere the dimensional element 1150*b* to the drapery 1190.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The invention claimed is:

1. A fabric adornment comprising:

a fabric, a magnetic element, and a series of decorative elements, the decorative elements comprising pieces of metalwork;

the fabric defining a drapery having a vertical leading edge and a concealing portion sized and disposed to extend adjacent to the vertical leading edge of the fabric and adapted to conceal the magnetic element, wherein the fabric defining the drapery has a given drape and a given shape comprising a visual appearance of the fabric, wherein the concealing portion comprises an inter-lining fabric connected to the fabric, wherein the inter-lining fabric is a layer between a lining and the fabric and the lining is a layer between the inter-lining fabric and the magnetic element, and wherein the inter-lining fabric is comprised of a cotton bump material of a thickness that does not inhibit a magnetic force of the magnetic element upon the series of decorative elements;

the magnetic element concealed within the concealing portion, wherein the magnetic element is adapted to releasably attract the series of decorative elements utilizing the magnetic force while maintaining the visual appearance of the fabric, wherein the magnetic element comprises two or more magnets contained in a mesh tape, the mesh tape and the two or more magnets being sized and disposed to extend adjacent to the vertical leading edge of the fabric, wherein the two or more magnets are enveloped in the mesh tape, wherein the mesh tape surrounds the two or more magnets on all sides to create a sleeve to hold the two or more magnets, wherein the mesh tape adheres to the two or more magnets, such that the position of at least one magnet of the two or more magnets is secured in the sleeve by the mesh tape, wherein the sleeve is parallel to the vertical leading edge of the fabric, wherein the mesh tape is tacked along a vertical axis to the lining, wherein a first portion of the mesh tape in contact with an upper surface and a lower surface of the at least one magnet of the two or more magnets is smooth to maintain consistency of the magnetic force over the lower surface and over the upper surface of the at least one magnet of the two or more magnets to provide level surfaces upon which to attach the series of decorative elements, wherein a second portion of the mesh tape in which the at least one magnet of the two or more magnets is not positioned is of a rougher texture than the first portion;

the series of decorative elements sized and adapted to rest substantially flush against and within a portion of a front side of the fabric adjacent to the vertical leading edge, wherein the series of decorative elements are joined to and supported from the portion of the front side of the fabric adjacent to the vertical leading edge by the magnetic force of the magnetic element, wherein the portion of the front side of the fabric adjacent to the vertical leading edge comprises a longitudinal axis that does not overlap the vertical leading edge, and wherein the visual appearance is maintained before and after joining the decorative elements to maintain a consistent aesthetic for the fabric.

* * * * *